Aug. 24, 1926.
W. L. POLLARD
1,596,995
AUTOMOBILE
Filed Feb. 7, 1924
3 Sheets-Sheet 2
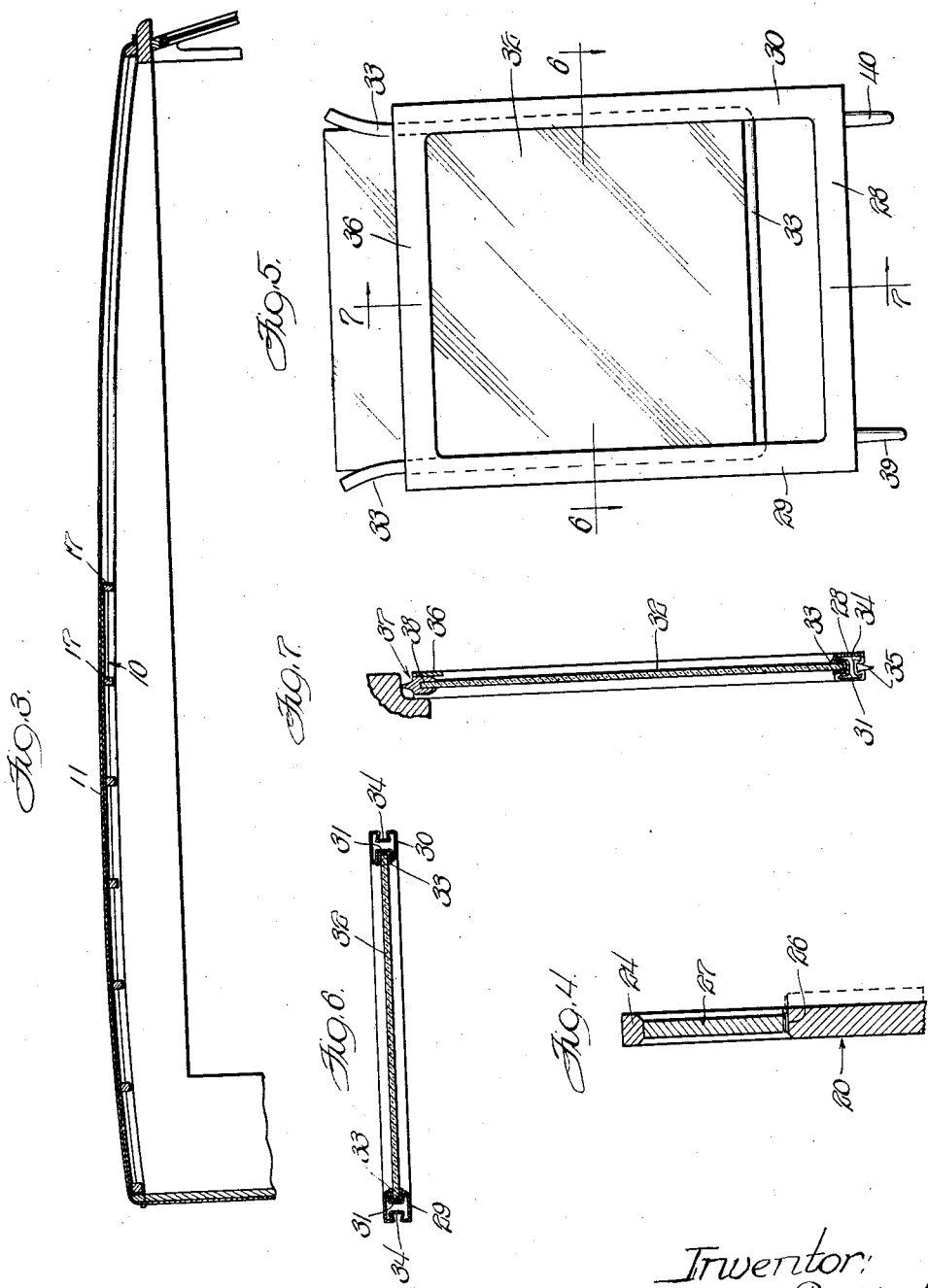
Inventor:
Willard L. Pollard
By Jones, Addington, Ames & Seibold
Attys.

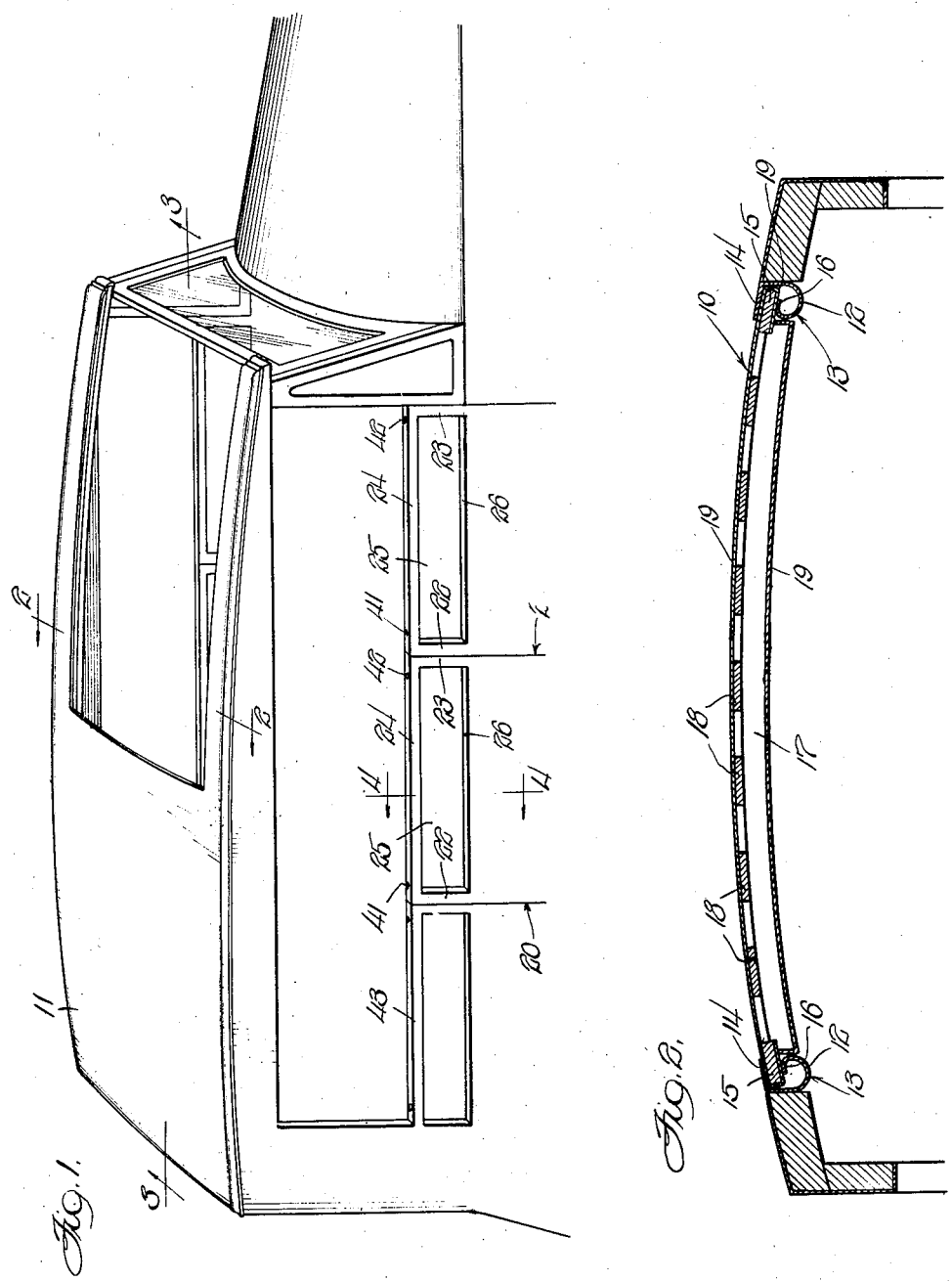

Aug. 24, 1926.
W. L. POLLARD
1,596,995
AUTOMOBILE
Filed Feb. 7, 1924     3 Sheets-Sheet 3
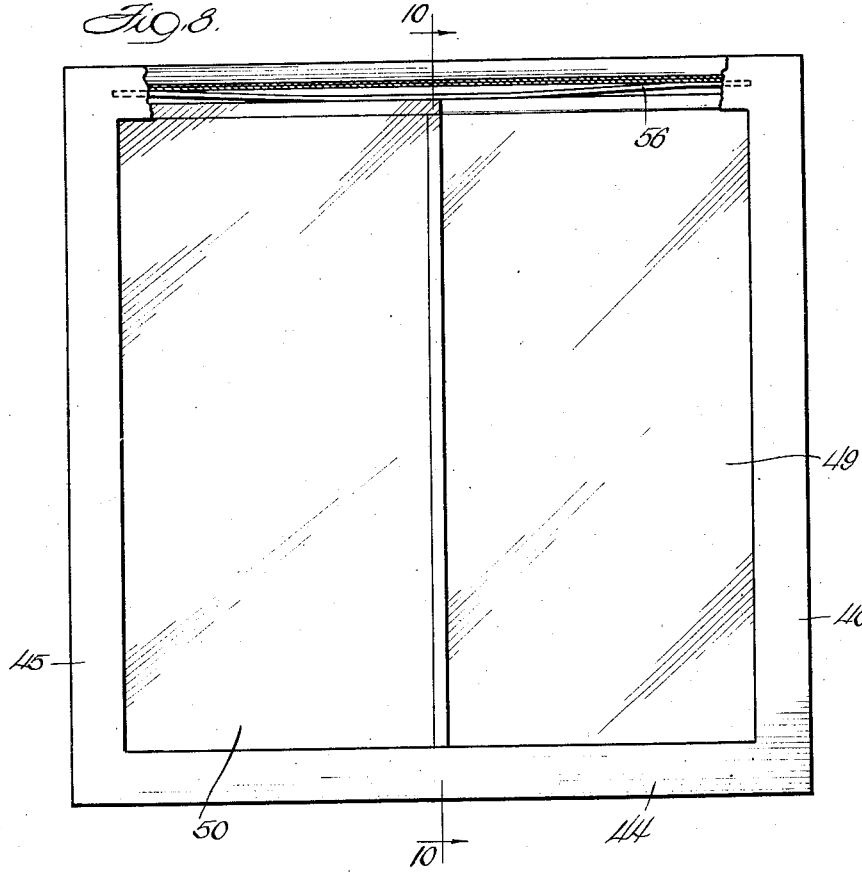
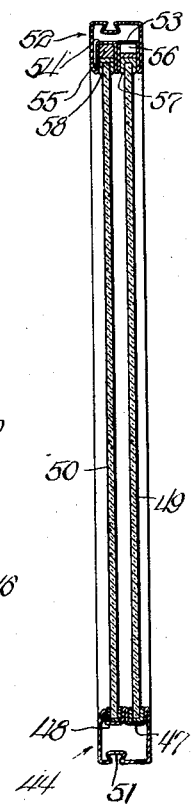
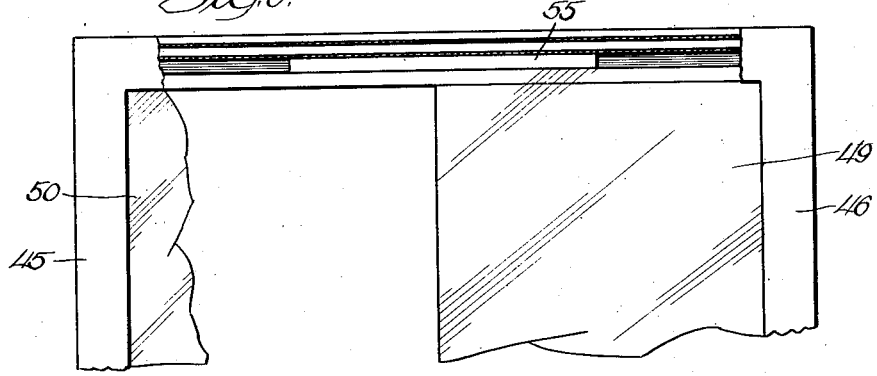
Inventor:
Willard L. Pollard
By Jones, Addington, Ames & Seibold
Attys.

Patented Aug. 24, 1926.

1,596,995

UNITED STATES PATENT OFFICE.

WILLARD L. POLLARD, OF EVANSTON, ILLINOIS, ASSIGNOR TO AIR-LITE AUTO TOP CO., OF CHICAGO, ILLINOIS, A CORPORATION OF ILLINOIS.

AUTOMOBILE.

Application filed February 7, 1924. Serial No. 691,089.

My invention relates to automobiles and more particularly to the body and top construction.

One of the objects of my invention is to provide an automobile body and top construction which will give full vision and ample ventilation.

Further objects will appear from the description and claims.

In the drawings in which an embodiment of my invention is shown—

Figure 1 is a perspective view of part of the body and top of an automobile;

Fig. 2 is a section on the line 2—2 of Fig. 1;

Fig. 3 is a section on the line 3—3 of Fig. 1;

Fig. 4 is a section on the line 4—4 of Fig. 1;

Fig. 5 is a side view of one of the removable vision panels;

Fig. 6 is a section on the line 6—6 of Fig. 5;

Fig. 7 is a section on the line 7—7 of Fig. 5;

Fig. 8 is a side view of a removable vision and ventilation panel;

Fig. 9 is a fragmentary view of the upper part of this panel; and

Fig. 10 is a section on the line 10—10 of Fig. 8.

The construction shown has a sliding panel in the roof which can be moved to provide an opening for vision and ventilation and has removable glass panels on the side which can be removed in fair warm weather for ventilation and increased vision and which can be put in place in winter or in stormy weather to form a completely enclosed car. Additional ventilation and vision is provided underneath these removable panels by openings in the doors and body.

Referring now to the drawings in detail, and first to the roof construction, this comprises a slidable panel 10, which can be slid under the rear roof section 11 to provide an opening in the front for vision and ventilation. In order to insure that no water will leak into the inside of the car at the edge of the slide 10, gutter members 12 are provided, formed as part of a metal molding 13, or the like, this metal molding having an upper flange portion 14 lying above the edge 15 of the slide 10, and acting as a guiding and retaining member for the upper side of the slide. The slide rests on the inturned edge 16 of the molding member 13 so that this molding member serves not only as a gutter member but also provides upper and lower guides for the edges of the slide. If desired, the molding may be somewhat resilient, so as to yieldingly embrace the edges of the slide to insure a snug connection at all times and prevent rattling.

The slide itself may comprise a plurality of wooden cross pieces 17, a plurality of longitudinally extending wooden strips 18 secured to the cross pieces 17, and a covering 19 of fabricoid or the like secured to the wooden frame work. This fabricoid covers the part of the slide 10 which engages the metal molding and serves as additional means for preventing rattling and insuring smooth action of the slide.

Referring now to the side construction, as shown in Fig. 1, each of the doors 20 and 21 is provided with a pair of standards 22 and 23 extending upwardly from the front and rear edges of the door respectively, a cross bar 24 being provided extending between the upper ends of these standards so that a rectangular opening 25 is provided bounded by the upper edge 26 of the door, the vertical standards 22 and 23 and the horizontal cross bar 24. This construction, together with a similar construction provided in the body back of the rear door provides a sort of railing all along the side of the car which gives a feeling of security to the occupants of the car. The openings underneath the horizontal extending cross bars may be closed by means of panels 27 (Fig. 4) hinged to the doors or the body of the car mounted to swing from the dotted line position shown in Fig. 4 to the full line position in which they close the openings.

Referring now to the vision panel shown in Figs. 5, 6 and 7, one of the objects in making this panel was to provide a rectangular metal frame in which all four sides of the frame are welded together or otherwise secured to form an integral four-sided frame, and in which the pane of glass with its rubber setting could be easily slid into place after the sections of the frame are all welded together. The lower side 28 of the frame, and the two vertical sides 29 and 30 are the same in cross section, this cross section being tubular, with channels 31 on the inside to receive the edges of the glass frame 32 with the rubber setting 33 and with channels 34 on the outside to receive the rubber weather strip 35.

The upper side 36 of the frame, however, is simply a bar as shown in Fig. 7 spaced from the pane of glass a distance equal to the thickness of the flange of the channel rubber setting 33 which embraces the edge of the glass so that a strip of this rubber channel may be fitted across the bottom and along the two side edges of the pane of glass as shown in Fig. 5, and the pane of glass with the rubber strip along the bottom and side edges can then be slid into place edgewise past the upper bar 36 to bring the pane of glass with the rubber strip fitted thereto into place in the channels 31 in the bottom and side members of the frame.

After the pane of glass has been slid into place, a rubber channel member 37 of special form, shown in Fig. 7, may be slipped over the upper edge of the pane of glass, one flange 38 of this rubber channel member lying between the pane of glass and the bar 36.

The metal pins 39 and 40 may be provided on the lower cross bar which can be slipped into sockets 41 and 42 on the door members to hold the frame in place.

Referring to the ventilation and vision panel shown in Figs. 8, 9 and 10, this may be used for closing the opening above the rear cross bar 43. This frame also is made of metal with all four sides of the frame integrally united as by welding and provision is made whereby the pane of glass may be slid into place after the bars of the frame have been welded together. In this form, the bottom 44 and the two sides 45 and 46 of the frame have the same cross section, shown in Fig. 10. This section is tubular, having two channels 47 and 48 along the inner side for the two panes of glass 49 and 50 and having a channel 51 on the outer side for a rubber weather strip. The upper frame bar 52 is similar in cross section but the channels 53 and 54 for the edges of the glass are considerably deeper, as shown in Fig. 10, to permit the insertion and removal of the panes of glass.

Various forms of retaining means may be provided between the upper edges of the pane of glass and the bottoms of the deep channels to hold the pane of glass against accidental displacement.

The drawing shows two different means, one a bar 55 of rigid metal secured in place in the bottom of the channel 54, and the other a leaf-spring 56 lying in the bottom of the channel 53. The leaf-spring retaining member 56 may remain in position in the deep channel 53 and the pane of glass 49 is removed simply by slipping it toward the middle of the frame, so that both of its side edges are free from the side members 45 and 46 of the frame, and then lifting up on the pane of glass, flattening the leaf-spring 56 out against the bottom of the channel 53 until the lower edge of the pane of glass is free from the shallow channel 47 in the lower frame member 44, and then lifting the lower edge of the pane of glass laterally away from the frame and then dropping the pane of glass to free the upper edge from the deep channel 53.

To remove the pane 50 which is retained by the solid metal plug 55, this plug is slid endwise in the channel until it is clear of the upper edge of the pane of glass and is then removed from the channel 54. The pane of glass can then be slid toward the middle of the frame to free both of its edges from the side frame bars 45 and 46 and the pane can then be lifted up to free the lower edge of the pane from the shallow channel 48 and the lower edge can then be moved outwardly and the pane dropped down to free the upper edge from the channel 54. Cushioning channel strips 57 and 58 of felt or the like may be secured to the upper edges of the panes 49 and 50 respectively to cushion the panes and prevent rattling.

This application is a continuation in part of the common subject matter claimed herein of my co-pending application, Serial No. 534,021, filed Feb. 4, 1922.

Having thus described my invention, what I claim as new and desire to secure by Letters Patent of the U. S. is:—

1. An automobile construction comprising an automobile body having a side door having vertical standards extending upwardly from the front and rear edges thereof, respectively, and a cross-bar extending between said standards, a readily displaceable closure panel for closing the opening bounded by the upper edge of the door, the standards, and the cross bar and a vision panel mounted on said cross bar with its lower edge engaging said cross-bar, said vision panel being mounted for ready attachment and detachment with respect to said cross bar.

2. An automobile construction comprising an automobile body having a side door having vertical standards extending upwardly from the front and rear edges thereof, respectively, and a cross-bar extending between said standards, a readily displaceable closure panel for closing the opening bounded by the upper edge of the door, the standards and the cross-bar and a vision panel mounted on said cross-bar with its lower edge engaging said cross-bar, said vision panel being mounted for ready attachment and detachment with respect to said door.

3. A side door construction for automobiles comprising a side door proper, mounted to swing about a substantially vertical axis, a transparent vision panel above said door and spaced therefrom, mounted to swing with said door, and a non-fragile ventilation panel mounted to swing about a horizontal axis adjacent the upper edge of said door from a position in which it closes the space between said door and transparent panel to a position in which it lies in a substantially vertical plane alongside the inner face of said door, said vision panel being readily attachable and detachable with respect to said door.

4. A side door construction for automobiles comprising a side door proper, mounted to swing about a substantially vertical axis, a transparent vision panel above said door and spaced therefrom, mounted to swing with said door, and a non-fragile ventilation panel mounted to swing about a horizontal axis adjacent the upper edge of said door from a position in which it closes the space between said door and transparent panel to a position in which it lies in a substantially vertical plane alongside the inner face of said door, said ventilation panel being mounted on said door independently of said vision panel and being readily attachable and detachable with respect to said door.

In witness whereof, I have hereunto subscribed my name.

WILLARD L. POLLARD.